(12) United States Patent
Fan et al.

(10) Patent No.: US 9,480,093 B2
(45) Date of Patent: Oct. 25, 2016

(54) METHOD AND SYSTEM FOR MOBILE USER TO ACCESS FIXED NETWORK

(71) Applicant: ZTE Corporation, Shenzhen, Guangdong (CN)

(72) Inventors: Liang Fan, Shenzhen (CN); Wei Mao, Shenzhen (CN); Jianjie You, Shenzhen (CN); Yong Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/438,414

(22) PCT Filed: Aug. 28, 2013

(86) PCT No.: PCT/CN2013/082482
§ 371 (c)(1),
(2) Date: Apr. 24, 2015

(87) PCT Pub. No.: WO2014/063530
PCT Pub. Date: May 1, 2014

(65) Prior Publication Data
US 2015/0282226 A1    Oct. 1, 2015

(30) Foreign Application Priority Data

Oct. 26, 2012   (CN) .......................... 2012 1 0417401

(51) Int. Cl.
*H04B 7/00*      (2006.01)
*H04W 76/02*   (2009.01)
(Continued)

(52) U.S. Cl.
CPC ........ *H04W 76/022* (2013.01); *H04L 12/4633* (2013.01); *H04L 45/50* (2013.01);
(Continued)

(58) Field of Classification Search
CPC   H04W 76/02; H04W 76/022; H04W 76/041
USPC .......................... 370/310, 329, 349, 431, 437
See application file for complete search history.

(56) References Cited

U.S. PATENT DOCUMENTS 8,687,631 B2 *  4/2014  Gundavelli ......... H04L 12/4633
                                                          370/338
9,204,336 B2 * 12/2015  Mihaly ............... H04L 12/4633
(Continued)

FOREIGN PATENT DOCUMENTS

| CN | 102457444 A | 5/2012 |
| CN | 102577330 A | 7/2012 |
| WO | 2012022357 A2 | 2/2012 |

OTHER PUBLICATIONS

Supplementary European Search Report in European application No. 13848756.6, mailed on Sep. 29, 2015.
(Continued)

*Primary Examiner* — Dmitry H Levitan
(74) *Attorney, Agent, or Firm* — Oppedahl Patent Law Firm LLC

(57) ABSTRACT

Disclosed is a method for a mobile user to access a fixed network, comprising: after a BNG and a TWAG establish a multi-protocol label switching (MPLS) tunnel and/or pseudowire, or a layer 2 tunneling protocol (L2TP) tunnel and/or session, the TWAG establishes a GPRS tunneling protocol (GTP)/proxy mobile internet protocol (PMIP) connection with a mobile network gateway according to user information, and acquires the address and service parameter of the user; and the TWAG transmits the service parameter of the user to the BNG via an MPLS control message or an L2TP control message. Also disclosed is a system for a mobile user to access a fixed network. The present invention standardizes user QoS security after the introduction of a TWAG, and can provide a user with better communication service, thus improving user experience.

20 Claims, 5 Drawing Sheets

(51) Int. Cl.
| | |
|---|---|
| *H04L 12/46* | (2006.01) |
| *H04W 12/06* | (2009.01) |
| *H04L 29/06* | (2006.01) |
| *H04L 12/857* | (2013.01) |
| *H04L 12/723* | (2013.01) |
| *H04L 12/721* | (2013.01) |
| *H04L 29/08* | (2006.01) |
| *H04L 12/825* | (2013.01) |
| *H04W 84/12* | (2009.01) |
| *H04W 88/16* | (2009.01) |

(52) U.S. Cl.
CPC .......... *H04L 45/68* (2013.01); *H04L 47/2491* (2013.01); *H04L 47/25* (2013.01); *H04L 63/0892* (2013.01); *H04L 67/141* (2013.01); *H04W 12/06* (2013.01); *H04W 76/02* (2013.01); *H04W 84/12* (2013.01); *H04W 88/16* (2013.01)

(56) References Cited

U.S. PATENT DOCUMENTS

| | | | |
|---|---|---|---|
| 2011/0090815 A1 | 4/2011 | Gundavelli | |
| 2013/0258963 A1 | 10/2013 | Mihaly et al. | |
| 2013/0343269 A1* | 12/2013 | Evans | H04W 40/02 370/328 |
| 2014/0071907 A1* | 3/2014 | Roeland | H04W 76/021 370/329 |
| 2014/0071969 A1* | 3/2014 | Roeland | H04W 76/026 370/338 |
| 2014/0331296 A1* | 11/2014 | Faccin | H04W 12/06 726/6 |
| 2014/0341138 A1* | 11/2014 | Roeland | H04W 76/021 370/329 |
| 2015/0103772 A1* | 4/2015 | Carnero Ros | H04L 45/04 370/329 |
| 2015/0296548 A1* | 10/2015 | Roeland | H04L 12/4633 370/329 |
| 2015/0334083 A1* | 11/2015 | Fan | H04L 61/203 709/245 |

OTHER PUBLICATIONS

S2a QoS Interworking Consideration for P4C BB2, mailed on Jul. 2012.
SA WG2 Meeting #92 S2 122700, mailed on Jul. 2012.
3GPP TR 23.839 V1.6.1 Study on Support of BBF Access Interworking, mailed on Sep. 2012.
3GPP TR 23.896 V0.3.0 Technical Report on Support for fixed broadband access network convergence, mailed on Oct. 2012.
International Search Report in international application No. PCT/CN2013/082482, mailed on Dec. 12, 2013.
English Translation of the Written Opinion of the International Search Authority in international application No. PCT/CN2013/082482, mailed on Dec. 12, 2013.

* cited by examiner

METHOD AND SYSTEM FOR MOBILE USER TO ACCESS FIXED NETWORK

TECHNICAL FIELD

The disclosure relates to a technology for the access of a mobile user through a fixed network, and in particular to a method and system for the access of the mobile user through the fixed network.

BACKGROUND

Along with the development of network technology and a growing need of a user in services, terminals are gradually evolved to modularization, and a multimode terminal supports access to access networks of different types to bear diversified services. Different network connections have different characteristics and transmission capabilities, so that requirements of the user on multiple services and diversity can be better met. The multimode terminal can realize seamless connection between wireless access networks of different types, such as connection between a Universal Mobile Telecommunications System (UMTS)/Enhanced Data Rate for GSM Evolution (EDGE)/General Packet Radio Service (GPRS) and IEEE 802.11 WLAN. The WLAN can provide a high data rate in a small home and hotspot area, a cellular network can provide higher flexibility and a ubiquitous coverage but is low in data rate, and if the advantages of the WLAN and the cellular network can be combined, the user may be benefited. Within the coverage of a WLAN access point, the multimode terminal implements data access and Voice over Internet Protocol (VoIP) applications by virtue of the WLAN, and can also realize a voice call or media access by virtue of an overlay cellular network.

At present, the international standard organization Broadband Forum (BBF) and the 3GPP are executing the standard work of Fixed Mobile Convergence (FMC), and an involved scenario includes authentication, address allocation and policy control for the access of 3GPP User Equipment (UE) through a Residential Gateway (RG) from a BBF network. In an authentication process, the 3GPP UE initiates, as an 802.1x customer service side, access authentication to the RG, and then the RG initiates, as an 802.1x authenticator and an RADIUS (Remote Authentication Dial In User Service) customer service side, an authentication request to a BBF AAA (Authentication Authorization Accounting) server. In an address request process, the 3GPP UE initiates an address request message to a Packet Data Network Gateway (PDN-GW) for an IP address through a Broadband Network Gateway (BNG). An S2a session is established between the BNG and the PDN-GW, and is implemented through a GPRS Tunnelling Protocol (GTP) or Proxy Mobile IP (PMIP) tunnel.

In a relevant art, the BNG of each user needs to establish an S2a session with the PDN-GW. In order to support the scenario in an existing network, all BNG equipment is required to be upgraded, which causes greater influence on the existing network. In order to solve the problem, a Trusted WLAN Access Gateway (TWAG) (or called a BBF WLAN Access Gateway) is introduced, an FMC network structure after the TWAG is introduced is shown in FIG. 1. After the introduction of the TWAG, the BNG equipment is not required to be upgraded in a large scale, and influence on the existing network can be reduced as much as possible. However, no standard about how to apply the network after the introduction of the TWAG is not provided in the relevant art, and particularly, influence on the BNG and the BBF AAA server has not been taken into account.

Multiple methods for user address allocation under a TWAG introduction scenario have been provided in the relevant art, but there is yet no effective solution to problems about the guarantee of the Quality of Service (QoS) in the relevant art and network architecture.

SUMMARY

In view of this, a main purpose of the embodiments of the disclosure is to provide a method and system for the access of a mobile user through a fixed network, so as to support the roaming access of the mobile user to a mobile network through the fixed network and ensure the QoS of a service.

In order to achieve the purpose, a technical solution of the embodiment of the disclosure is implemented as follows.

A method for the access of a mobile user through a fixed network includes:

after a BNG establishes a Multi-Protocol Label Switching (MPLS) tunnel and/or Pseudo Wire (PW) or a Layer 2 Tunnel Protocol (L2TP) tunnel and/or session with a TWAG, the TWAG establishes a GTP/PMIP connection with a mobile network gateway according to user information, and acquires an address and service parameter of a user; and the TWAG transmits the service parameter of the user to the BNG through an MPLS control message or an L2TP control message.

Preferably, the step that the BNG establishes the L2TP tunnel and/or session with the TWAG includes:

the BNG initiates an authentication request to a BBF AAA server after receiving an authentication request from the user, and establishes the L2TP tunnel and/or session with the TWAG according to an indication decision carried in a received authentication response message transmitted by the BBF AAA server.

Preferably, the step that the TWAG establishes the GTP/PMIP connection with the mobile network gateway, and acquires the address and service parameter of the user includes:

the TWAG establishes the GTP/PMIP connection with the mobile network gateway according to the user information after receiving an Incoming Call Connected (ICCN) message in an L2TP session establishment stage from the BNG, and acquires the address and service parameter of the user;

or, the TWAG establishes the GTP/PMIP connection with the mobile network gateway according to the user information after receiving an address request message in a Point-to-Point Protocol IP Control Protocol (PPP IPCP) stage from the BNG, and acquires the address and service parameter of the user.

Preferably, before the TWAG establishes the GTP/PMIP connection with the mobile network gateway, the method further includes:

the TWAG initiates a GTP/PMIP connection request to the mobile network gateway after the user information in the ICCN message passes authentication;

or, the TWAG directly initiates the GTP/PMIP connection request to the mobile network gateway without authenticating the user information in the ICCN message;

or, the TWAG initiates an authentication request to the user after receiving the ICCN message, re-authenticates an identity of the user, and initiates the GTP/PMIP connection request to the mobile network gateway after the user passes authentication.

Preferably, the step that the BNG establishes the MPLS tunnel and/or PW with the TWAG includes:

the BNG initiates an authentication request to the BBF AAA server after receiving an authentication request from the user, and establishes the MPLS tunnel and/or PW with the TWAG according to an indication decision carried in a received authentication response message transmitted by the BBF AAA server.

Preferably, the step that the TWAG establishes the GTP/PMIP connection with the mobile network gateway according to the user information, and acquires the address and service parameter of the user includes:

the TWAG establishes the GTP/PMIP connection with the mobile network gateway according to the user information after receiving the user address request message transmitted by the BNG through the MPLS tunnel and/or PW, and acquires the address and service parameter of the user.

Preferably, before the TWAG establishes the GTP/PMIP connection with the mobile network gateway, the method further includes:

the BNG transmits a message in a user authentication stage between the TWAG and the user through the MPLS tunnel and/or PW to finish the identity authentication of the user with the TWAG.

Preferably, the step that the TWAG transmits the service parameter of the user to the BNG through the MPLS control message or the L2TP control message includes:

the TWAG transmits the acquired service parameter of the user to the BNG through a Set-Link-Info (SLI) message, or a new message or an extended SLI message;

or, the TWAG transmits the acquired service parameter of the user to the BNG through a Label Switched Path (LSP) or PW notification message or an extended LSP or PW notification message.

Preferably, the method further includes:

the service parameter of the user is packaged in an Attribute Value Pair (AVP) format in the extended SLI message;

or, the service parameter of the user is packaged in a Type-Length-Value (TLV) format in the extended LSP or PW notification message.

Preferably, the method further includes:

different sessions for different users carrying the same Access Point Name (APN) information are established in the same L2TP tunnel between the BNG and the TWAG;

or, different sessions for different users carrying different APN information are established in the same L2TP tunnel between the BNG and the TWAG;

or, different L2TP tunnels for different users carrying the same APN information are established between the BNG and the TWAG.

Preferably, the method further includes:

different sessions for different connection establishment requests of the same user carrying different APN information are established between the BNG and the TWAG.

Preferably, the method further includes:

a PW for different users carrying the same APN information is established in the same MPLS tunnel between the BNG and the TWAG;

or, a PW for different users carrying different APN information is established in the same MPLS tunnel between the BNG and the TWAG;

or, different MPLS tunnels for different users carrying the same APN information are established between the BNG and the TWAG;

or, the MPLS tunnels are not established between the BNG and the TWAG, and different PWs for different users carrying different APN information are established between the BNG and the TWAG.

Preferably, the method further includes:

different PWs for different connection establishment requests of the same user carrying different APN information are established between the BNG and the TWAG;

or, the same PW for different connection establishment requests of the same user carrying different APN information is established and used between the BNG and the TWAG.

Preferably, the method further includes:

when the service parameter of the user changes, the TWAG transmits an MPLS control message or an L2TP control message to the BNG, and transmits the updated service parameter of the user to the BNG.

Preferably, after the step that the TWAG transmits the service parameter of the user to the BNG, the method further includes:

the TWAG transmits the address of the user to the user.

A system for the access of a mobile user through a fixed network includes a BNG, a TWAG and a mobile network gateway, wherein the BNG is configured to establish an MPLS tunnel and/or PW or an L2TP tunnel and/or session with the TWAG; and the TWAG is configured to establish a GTP/PMIP connection with the mobile network gateway according to user information, acquire an address and service parameter of a user, and transmit the service parameter of the user to the BNG through an MPLS control message or an L2TP control message.

Preferably, the system further includes a BBF AAA server; and the BNG is further configured to initiate an authentication request to the BBF AAA server after receiving an authentication request from the user, and establish the L2TP tunnel and/or session with the TWAG according to an indication decision carried in a received authentication response message transmitted by the BBF AAA server.

Preferably, the TWAG is further configured to establish the GTP/PMIP connection with the mobile network gateway according to the user information after receiving an ICCN message in an L2TP session establishment stage from the BNG, and acquire the address and service parameter of the user;

or, establish the GTP/PMIP connection with the mobile network gateway according to the user information after receiving an address request message in a PPP IPCP stage from the BNG, and acquire the address and service parameter of the user.

Preferably, before the TWAG establishes the GTP/PMIP connection with the mobile network gateway, the TWAG is further configured to initiate a GTP/PMIP connection request to the mobile network gateway after the user information in the ICCN message passes authentication;

or, directly initiate the GTP/PMIP connection request to the mobile network gateway without authenticating the user information in the ICCN message;

or, initiate an authentication request to the user after receiving the ICCN message, re-authenticate an identity of the user, and initiate the GTP/PMIP connection request to the mobile network gateway after the user passes authentication.

Preferably, the system further includes the BBF AAA server; and the BNG is further configured to initiate an authentication request to the BBF AAA server after receiving an authentication request from the user, and establish the MPLS tunnel and/or PW with the TWAG according to an indication decision carried in a received authentication response message transmitted by the BBF AAA server.

Preferably, the TWAG is further configured to establish the GTP/PMIP connection with the mobile network gateway according to the user information after receiving the user address request message transmitted by the BNG through the MPLS tunnel and/or PW, and acquire the address and service parameter of the user.

Preferably, before the TWAG establishes the GTP/PMIP connection with the mobile network gateway, the BNG is further configured to transmit a message in a user authentication stage between the TWAG and the user through the MPLS tunnel and/or PW to finish the identity authentication of the user with the TWAG.

Preferably, the TWAG is further configured to transmit the acquired service parameter of the user to the BNG through an SLI message, or a new message or an extended SLI message;

or, transmit the acquired service parameter of the user to the BNG through an LSP or PW notification message or an extended LSP or PW notification message.

Preferably, different sessions for different users carrying the same APN information are established in the same L2TP tunnel between the BNG and the TWAG;

or, different sessions for different users carrying different APN information are established in the same L2TP tunnel between the BNG and the TWAG;

or, different L2TP tunnels for different users carrying the same APN information are established between the BNG and the TWAG.

Preferably, different sessions for different connection establishment requests of the same user carrying different APN information are established between the BNG and the TWAG.

Preferably, a PW for different users carrying the same APN information is established in the same MPLS tunnel between the BNG and the TWAG;

or, a PW for different users carrying different APN information is established in the same MPLS tunnel between the BNG and the TWAG;

or, different MPLS tunnels for different users carrying the same APN information are established between the BNG and the TWAG;

or, the MPLS tunnels are not established between the BNG and the TWAG, and different PWs for different users carrying different APN information are established between the BNG and the TWAG.

Preferably, different PWs for different connection establishment requests of the same user carrying different APN information are established between the BNG and the TWAG;

or, the same PW for different connection establishment requests of the same user carrying different APN information is established and used between the BNG and the TWAG.

In the embodiments of the disclosure, after the MPLS tunnel and/or PW or the L2TP tunnel and/or session is established between the BNG and the TWAG, the TWAG establishes the GTP/PMIP connection with the mobile network gateway according to the UE information, and acquires the address and service parameter of the UE; and the TWAG sends the service parameter of the UE to the BNG through the MPLS control message or the L2TP control message. According to the embodiments of the disclosure, the guarantee of the QoS for the UE after the introduction of the TWAG is standardized, better communication service can be provided for the user, thus improving user experience.

DETAILED DESCRIPTION

In order to make clearer the purpose, technical solution and advantages of the disclosure, the disclosure is further described below with reference to embodiments and the drawings in detail.

Figure 1:
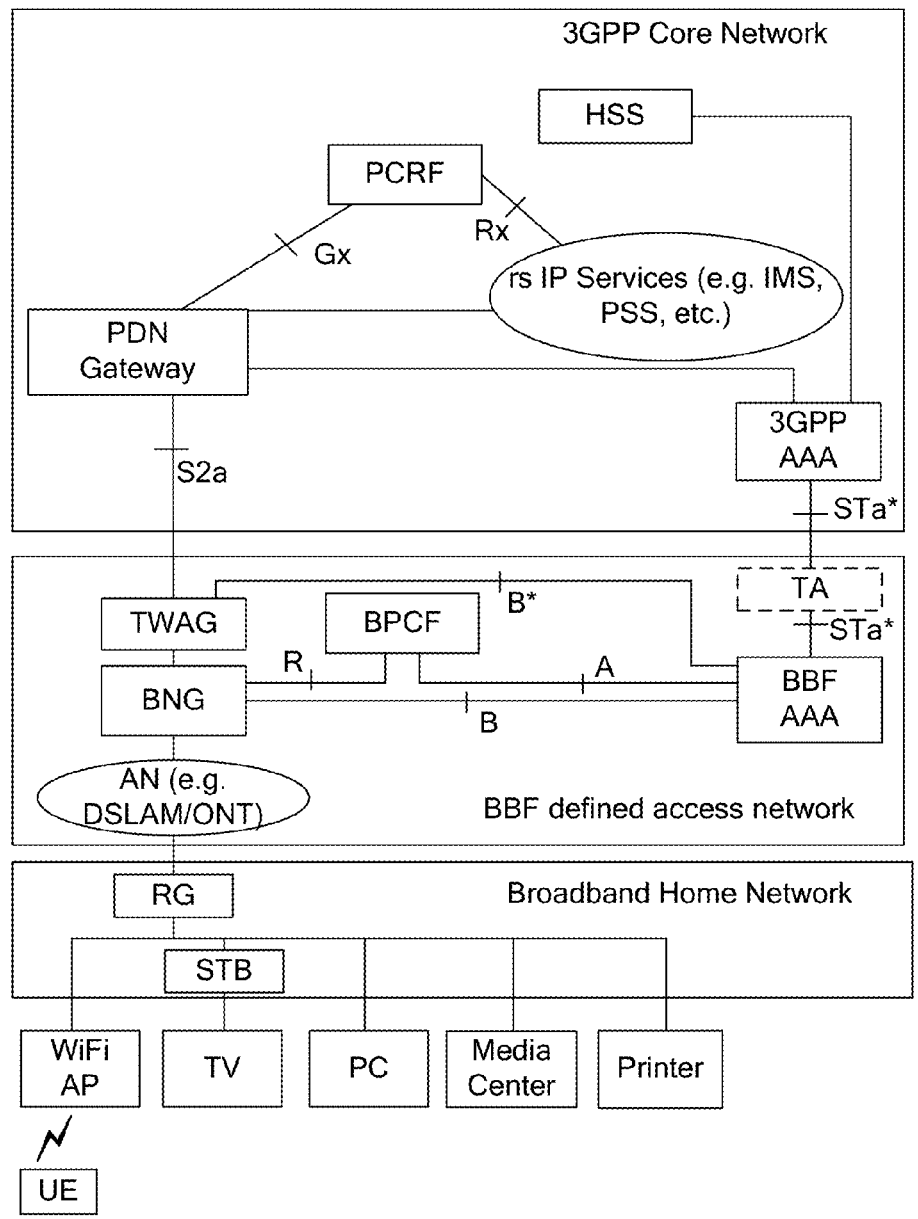
FIG. 1 is a diagram of an FMC architecture according to the relevant art.

A system for the access of a mobile UE through a fixed network according to the disclosure is described with reference to the network architecture as shown in FIG. 1 in detail. The system for the access of the mobile UE through the fixed network includes a BNG, a TWAG and a mobile network gateway. The BNG is configured to establish an MPLS tunnel and/or PW, or an L2TP tunnel and/or session with the TWAG.

The TWAG is configured to establish a GTP/PMIP connection with the mobile network gateway according to UE information, acquire an address and service parameter of the UE, and send the service parameter of the UE to the BNG through an MPLS control message or an L2TP control message.

Here, the mobile network gateway may refer to a PDN GW.

Those skilled in the art should understand that the technical solution of the disclosure mainly improves functions of a part of network elements in the network architecture as shown in FIG. 1, but does not change the network architecture. Therefore, only the functions of the related network elements of which the functions are improved are described below in detail, and functions of unchanged network elements will not be repeated.

The system for the access of the mobile UE through the fixed network may further include a BBF AAA server.

The BNG may be configured to initiate an authentication request to the BBF AAA server after receiving an authentication request from the user, and establish the L2TP tunnel and/or session with the TWAG according to an indication decision carried in a received authentication response message transmitted by the BBF AAA server.

The TWAG may be further configured to acquire user information in an ICCN message after receiving the ICCN message in an L2TP session establishment stage from the BNG, establish the GTP/PMIP connection with the PDN GW according to the user information, and acquire the address and service parameter of the user;

or, establish the GTP/PMIP connection with the PDN GW according to the user information after receiving an address request message in a PPP IPCP stage from the BNG, and acquire the address and service parameter of the user.

Before the TWAG establishes the GTP/PMIP connection with the PDN GW, the TWAG may be configured to initiate a GTP/PMIP connection request to the PDN GW after the user information in the ICCN message passes authentication;

or, directly initiate the GTP/PMIP connection request to the PDN GW without authenticating the user information in the ICCN message;

or, initiate an authentication request to the user after receiving the ICCN message, re-authenticate an identity of the user, and initiate the GTP/PMIP connection request to the PDN GW after the user passes authentication.

The BNG in the disclosure may be configured to initiate an authentication request to the BBF AAA server after receiving an authentication request from the user, and establish the MPLS tunnel and/or PW with the TWAG according to an indication decision carried in a received authentication response message transmitted by the BBF AAA server.

The TWAG may be configured to establish the GTP/PMIP connection with the PDN GW according to the user information after receiving the user address request message transmitted by the BNG through the MPLS tunnel and/or PW, and acquire the address and service parameter of the user.

Before the TWAG establishes the GTP/PMIP connection with the PDN GW, the BNG may be configured to transmit a message in a user authentication stage between the TWAG and the user through the MPLS tunnel and/or PW to finish the identity authentication of the user with the TWAG.

The TWAG may be configured to transmit the acquired service parameter of the user to the BNG through an SLI message, or a new message or an extended SLI message;

or, transmit the acquired service parameter of the user to the BNG through an LSP or PW notification message or an extended LSP or PW notification message.

The service parameter of the UE may be packaged in an AVP format in the extended SLI message;

or, the service parameter of the UE may be packaged in a TLV format in the extended LSP or PW notification message.

In the disclosure, different sessions for different UEs carrying the same APN information may be established in the same L2TP tunnel between the BNG and the TWAG; or, different sessions for different users carrying different APN information may be established in the same L2TP tunnel between the BNG and the TWAG; or, different L2TP tunnels for different users carrying the same APN information may be established between the BNG and the TWAG.

In the disclosure, different sessions for different connection establishment requests of the same user carrying different APN information may be established between the BNG and the TWAG.

In the disclosure, a PW for different users carrying the same APN information may be established in the same MPLS tunnel between the BNG and the TWAG; or, a PW for different users carrying different APN information may be established in the same MPLS tunnel between the BNG and the TWAG; or, different MPLS tunnels for different users carrying the same APN information may be established between the BNG and the TWAG; or, the MPLS tunnels are not established between the BNG and the TWAG, and different PWs for different users carrying different APN information may be established between the BNG and the TWAG.

In the disclosure, different PWs for different connection establishment requests of the same user carrying different APN information may be established between the BNG and the TWAG; or, the same PW for different connection establishment requests of the same user carrying different APN information may be established and used between the BNG and the TWAG.

When the service parameter of the user changes, the TWAG may also send an MPLS control message or an L2TP control message to the BNG, so as to send the updated service parameter of the user to the BNG.

After the TWAG sends the service parameter of the user to the BNG, the TWAG sends the address of the user to the user.

In the disclosure, the service parameter of the user includes, but not limited to, related information of QoS, such as bandwidth information, priority information, minimum traffic information and time delay information.

In the disclosure, the user may particularly refer to a 3GPP UE.

The substance of the technical solution of the disclosure is further described below with reference to specific application examples.

Figure 2:
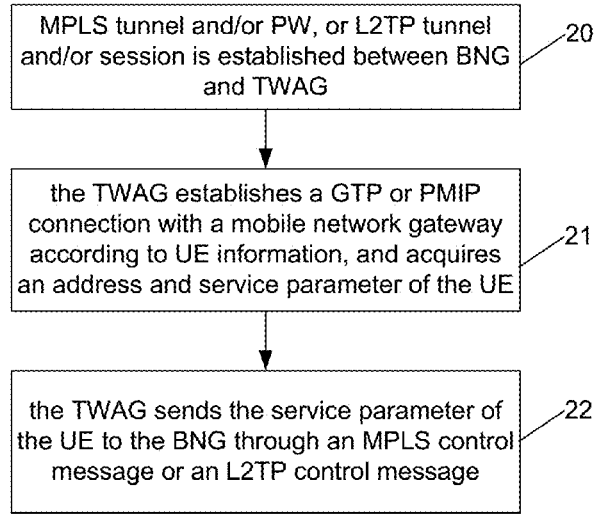
FIG. 2 is a flowchart of a method for the access of a mobile user through a fixed network according to an embodiment of the disclosure.

FIG. 2 is a flowchart of a method for the access of a mobile user through a fixed network according to an embodiment of the disclosure, and as shown in FIG. 2, the method for the access of the mobile user through the fixed network according to the disclosure includes the following steps.

Step 20: a BNG establishes an MPLS tunnel and/or PW or an L2TP tunnel and/or session with a TWAG.

Step 21: the TWAG establishes a GTP or PMIP connection with a mobile network gateway according to user information, and acquires an address and service parameter of a user.

Step 22: the TWAG transmits the service parameter of the user to the BNG through an MPLS control message or an L2TP control message.

Method Embodiment 1

Figure 3:
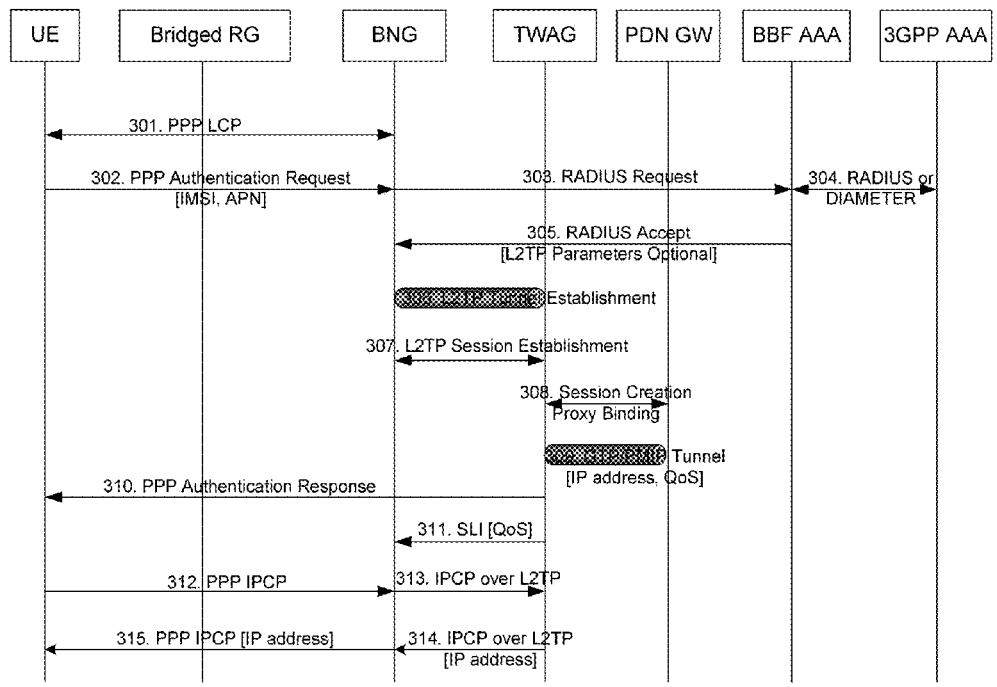
FIG. 3 is a flowchart of a method for the access of a mobile user through a fixed network according to embodiment 1 of the disclosure.

FIG. 3 is a flowchart of a method for the access of a mobile user through a fixed network according to embodiment 1 of the disclosure. As shown in FIG. 3, the method for the access of the mobile user through the fixed network according to the embodiment includes the following steps.

Step 301: UE and a BNG performs PPP Link Control Protocol (PPP LCP) stage negotiation after Point to Point Protocol over Ethernet (PPPoE) negotiation is finished.

Step 302: the UE initiates a PPP authentication request. The PPP authentication request is carried with an IMSI (International Mobile Subscriber Identification Number) as well as APN information. Optionally, an Extensible Authentication Protocol-Authentication and Key Agreement (EAP-AKA) may be adopted for authentication.

Step 303: the BNG initiates a Radius authentication request to a BBF AAA server.

Step 304: the BBF AAA server and a 3GPP AAA server performs user identity authentication.

Step 305: the BBF AAA server transmits an authentication success message to the BNG.

Optionally, the authentication success message may carry an L2TP parameter for triggering the BNG to establish an L2TP tunnel.

Step 306: the BNG and the TWAG establish the L2TP tunnel.

Optionally, if a current user has an available established tunnel, the operator allows the adoption of the same L2TP tunnel for users with the same APN, and the L2TP tunnel has been established for the other users with the same APN, then this step can be skipped.

Furthermore, the BNG may initiate an L2TP tunnel establishment request according to the L2TP parameter carried in the authentication success message and/or a locally configured L2TP parameter.

Specifically, the L2TP tunnel between the BNG and the TWAG may be of a level of correspondence to each APN, or correspondence to each APN of each UE, or correspondence to BNG equipment of each UE.

Step 307: the BNG and the TWAG establish an L2TP session for the user, wherein an ICCN message at a session establishment stage carries user information.

Step 308: the TWAG establishes a session with a PDN GW according to the user information.

Step 309: the TWAG establishes a GTP/PMIP tunnel with the PDN GW according to the user information, and the PDN GW allocates an IP address to the user and transmits a QoS parameter of the user to the TWAG.

Step 310: the TWAG transmits a PPP authentication success message to the UE through the BNG.

Step 311: the TWAG transmits the QoS parameter of the user to the BNG through an SLI message or a new message.

In the embodiment, Step 310 and Step 311 can be executed in a random sequence during practical deployment.

Step 312: the user of the UE initiates an address request message at the PPP IPCP stage.

Step 313: the BNG performs L2TP packaging on the address request message, and then forwards the address request message to the TWAG.

Step 314: the TWAG transmits user address information to the BNG.

Step 315: the BNG transmits the user address information to the user.

Furthermore, when the QoS parameter (such as a bandwidth and a priority) of the UE changes, the TWAG can retransmit an SLI message to the BNG. The SLI message carries the updated QoS parameter.

Method Embodiment 2

Figure 4:
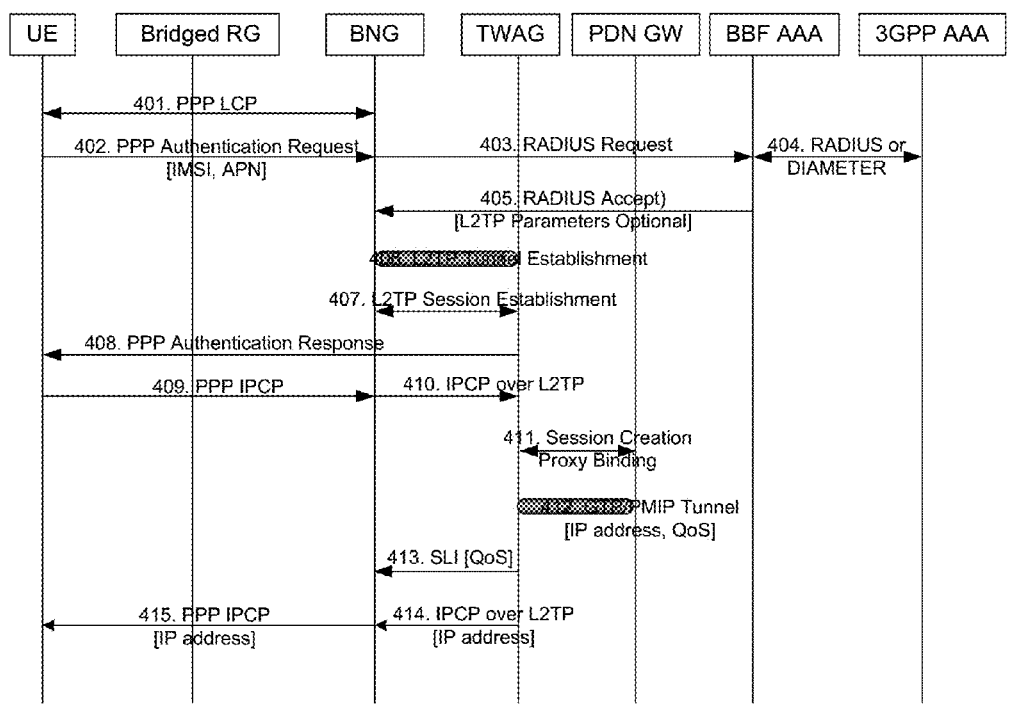
FIG. 4 is a flowchart of a method for the access of a mobile user through a fixed network according to embodiment 2 of the disclosure.

FIG. 4 is a flowchart of a method for the access of a mobile user through a fixed network according to embodiment 2 of the disclosure, and as shown in FIG. 4, the method for the access of the mobile user through the fixed network according to the embodiment includes the following steps:

Step 401: UE and a BNG performs PPP LCP stage negotiation after finishing PPPoE negotiation.

Step 402: the UE initiates a PPP authentication request, wherein the PPP authentication request carries an IMSI and APN information.

Step 403: the BNG initiates a RADIUS authentication request to a BBF AAA server.

Step 404: the BBF AAA server and a 3GPP AAA server performs user identity authentication.

Step 405: the BBF AAA server transmits an authentication success message to the BNG.

Optionally, the authentication success message may carry an L2TP parameter for triggering the BNG to establish an L2TP tunnel.

Step 406: the BNG and the TWAG establish the L2TP tunnel.

Optionally, if a current user has an available established tunnel, an operator allows the adoption of the same L2TP tunnel for users with the same APN and the L2TP tunnel has been established for the other users with the same APN, the step can be skipped.

Furthermore, the BNG can initiate an L2TP tunnel establishment request according to the L2TP parameter carried in the authentication success message and/or a locally configured L2TP parameter.

Step 407: the BNG and the TWAG establish an L2TP session for the user, wherein an ICCN message in a session establishment stage carries user information.

Furthermore, the TWAG can select to extract the user information in the message to initiate authentication to the BBF AAA server, or not to initiate authentication or to perform PPP authentication with the user again after receiving the ICCN message.

Step 408: the TWAG transmits a PPP authentication success message to the UE through the BNG.

Step 409: the user initiates an address request message in a PPP IPCP stage.

Step 410: the BNG performs L2TP packaging on the address request message, and forwards the address request message to the TWAG.

Step 411: the TWAG establishes a session with a PDN GW according to the user information.

Step 412: the TWAG establishes a GTP/PMIP tunnel with the PDN GW according to the user information, and the PDN GW allocates an IP address to the user, and simultaneously transmits a QoS parameter of the user to the TWAG.

Step 413: the TWAG transmits the QoS parameter of the user to the BNG through an SLI message.

Step 414: the TWAG transmits user address information to the BNG.

Step 415: the BNG transmits the user address information to the user.

In the embodiment, Step 413 and Step 414 can be executed in a random sequence during practical deployment.

Furthermore, when the QoS parameter (such as a bandwidth and a priority) of the user of the UE changes, the TWAG can retransmit an SLI message to the BNG, wherein the SLI message carries the updated QoS parameter.

Method Embodiment 3

Figure 5:
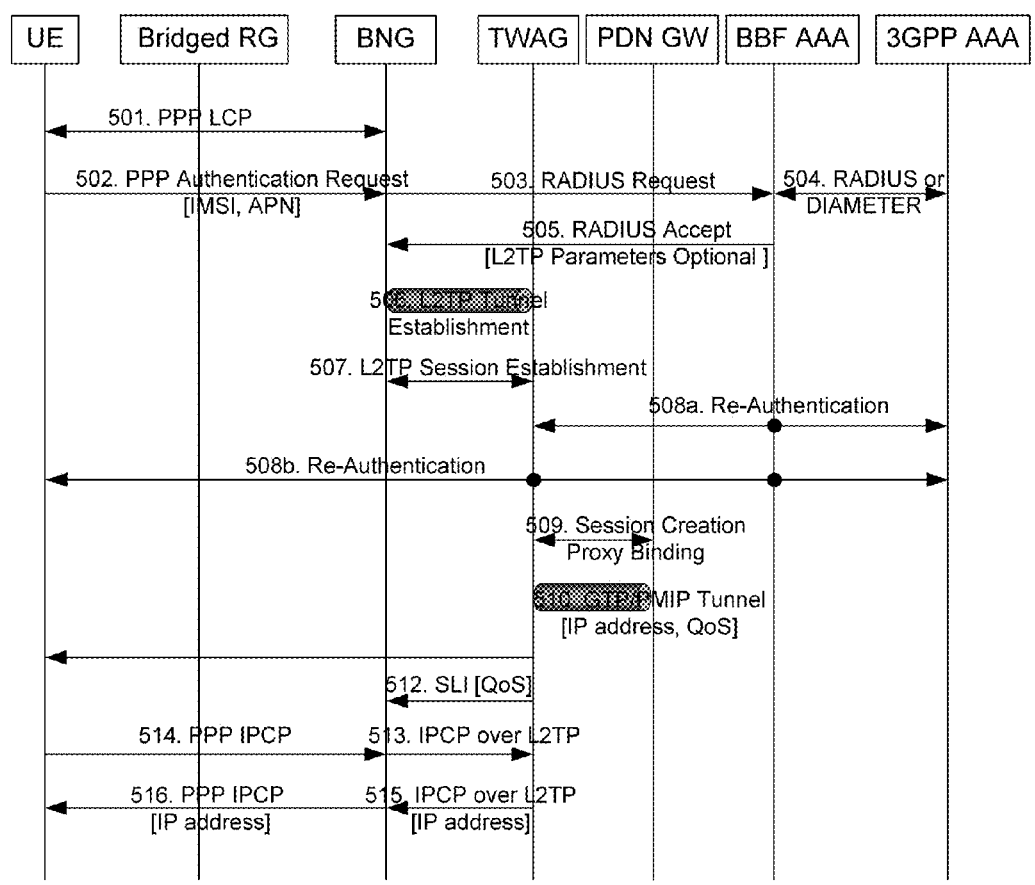
FIG. 5 is a flowchart of a method for the access of a mobile user through a fixed network according to embodiment 3 of the disclosure.

FIG. 5 is a flowchart of a method for the access of a mobile user through a fixed network according to embodiment 3 of the disclosure, and as shown in FIG. 5, the method for the access of the mobile user through the fixed network according to the embodiment includes the following steps:

Step 501: UE and a BNG performs PPP LCP stage negotiation after finishing PPPoE negotiation.

Step 502: the UE initiates a PPP authentication request, wherein the PPP authentication request carries an IMSI and APN information; and optionally, an EAP-AKA can be adopted for authentication.

Step 503: the BNG initiates a RADIUS authentication request to a BBF AAA server.

Step 504: the BBF AAA server and a 3GPP AAA server performs user identity authentication.

Step 505: the BBF AAA server transmits an authentication success message to the BNG.

Optionally, the authentication success message may carry an L2TP parameter for triggering the BNG to establish an L2TP tunnel.

Step 506: the BNG and the TWAG establish the L2TP tunnel.

Optionally, if a current user has an available established tunnel, an operator allows the adoption of the same L2TP tunnel for users with the same APN and the L2TP tunnel has been established for the other users with the same APN, the step can be skipped.

Furthermore, the BNG can initiate an L2TP tunnel establishment request according to the L2TP parameter carried in the authentication success message and/or a locally configured L2TP parameter.

Specifically, the L2TP tunnel between the BNG and the TWAG may be of a level of correspondence to each APN or each APN or BNG equipment of each piece of UE.

Step 507: the BNG and the TWAG establish an L2TP session for the user, wherein an ICCN message in a session establishment stage carries user information.

Step 508a: the TWAG performs secondary authentication on the UE, that is, the TWAG initiates authentication on the user information in the ICCN message to the BBF AAA/3GPP AAA server; or Step 508b: the TWAG initiates an authentication request to the user to re-authenticate an identity of the user.

Step 509: the TWAG establishes a session with a PDN GW according to the user information.

Step 510: the TWAG establishes a GTP/PMIP tunnel with the PDN GW according to the user information, and the PDN GW allocates an IP address to the user, and simultaneously transmits a QoS parameter of the user to the TWAG.

Step 511: the TWAG transmits a PPP authentication success message to the UE through the BNG.

Step 512: the TWAG transmits the QoS parameter of the user to the BNG through an SLI message.

In the embodiment, Step 511 and Step 512 can be executed in a random sequence during practical deployment.

Step 513: the user initiates an address request message in a PPP IPCP stage.

Step 514: the BNG performs L2TP packaging on the address request message, and forwards the address request message to the TWAG.

Step 515: the TWAG transmits user address information to the BNG.

Step 516: the BNG transmits the user address information to the user.

Furthermore, when the QoS parameter (such as a bandwidth and a priority) of the user of the UE changes, the TWAG can retransmit an SLI message to the BNG, wherein the SLI message carries the updated QoS parameter.

Method Embodiment 4

Figure 6:
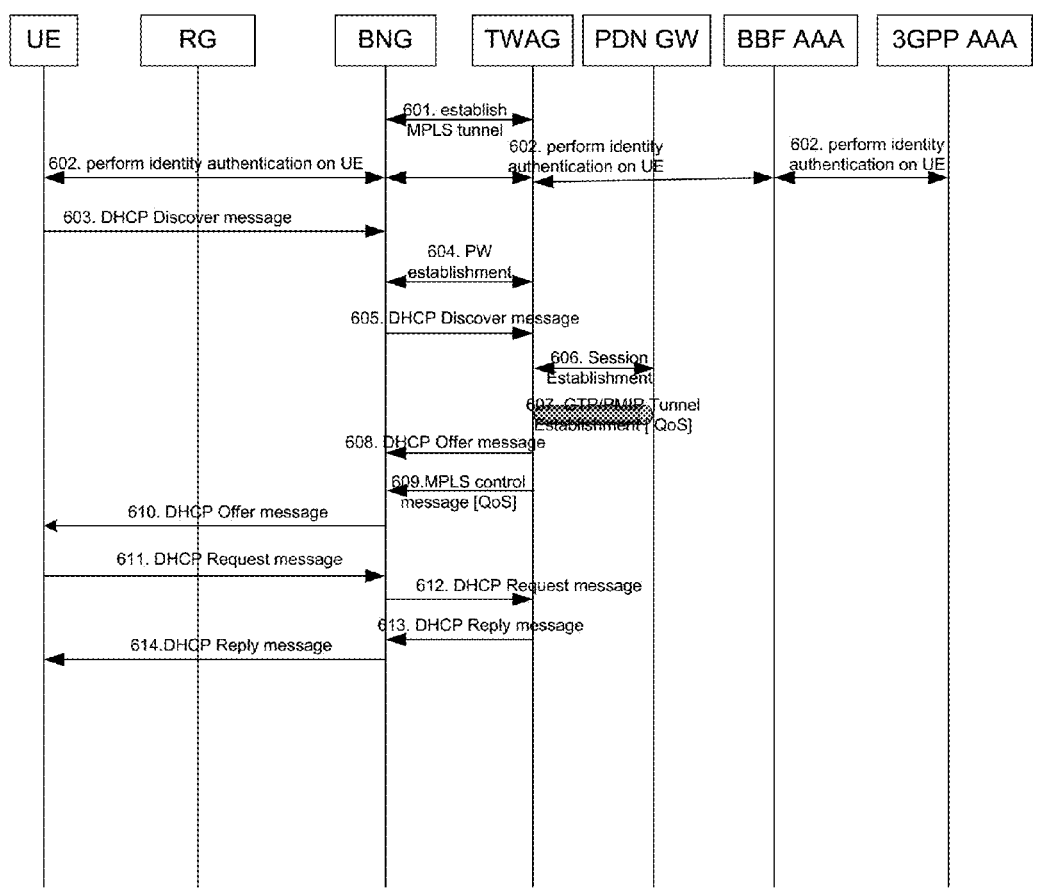
FIG. 6 is a flowchart of a method for the access of a mobile user through a fixed network according to embodiment 4 of the disclosure.

FIG. 6 is a flowchart of a method for the access of a mobile user through a fixed network according to embodiment 4 of the disclosure, and as shown in FIG. 6, the method for the access of the mobile user through the fixed network according to the embodiment includes the following steps:

Step 601: an MPLS tunnel is established between a BNG and a TWAG through a Label Distribution Protocol (LDP) or a Resource Reservation Protocol-Traffic Engineering (RSVP-TE).

Step 602: UE initiates an EAP authentication request, and finishes identity authentication with the BNG, a BBF AAA server and a 3GPP AAA server, and the BBF AAA server notifies the BNG that the UE is 3GPP UE.

Step 603: the UE initiates a Dynamic Host Configuration Protocol (DHCP) Discover message, wherein the DHCP Discover message carries an IMSI and APN information.

Step 604: the BNG initiates a PW establishment request to the TWAG after receiving the DHCP Discover message of the UE, and interacts with the TWAG to finish the establishment of a PW.

Step 605: the BNG transmits the DHCP Discover message of the UE to the TWAG through the established PW.

Step 606: the TWAG establishes a session with a PDN GW according to user information.

Step 607: the TWAG establishes a GTP/PMIP tunnel with the PDN GW according to the user information, and the PDN GW allocates an IP address to a user, and simultaneously transmits a QoS parameter of the user to the TWAG.

Step 608: the TWAG transmits a DHCP Offer message to the BNG through the PW.

Step 609: the TWAG transmits the QoS parameter of the user to the BNG through an MPLS control message (such as an LSP notification message and a PW notification message) or a new message.

Step 608 and Step 609 can be executed in a random sequence during practical deployment.

Step 610: the BNG transmits the DHCP Offer message to the UE.

Step 611: the UE transmits a DHCP Request message.

Step 612: the BNG performs PW packaging on the DHCP Request message, and forwards the DHCP Request message to the TWAG.

Step 613: the TWAG performs PW packaging on a DHCP Reply message, and transmits the DHCP Reply message to the BNG, wherein the DHCP Reply message carries the address of the user.

Step 614: the BNG transmits the DHCP Reply message to the user.

Furthermore, when the QoS parameter (such as a bandwidth and a priority) of the user of the UE changes, the TWAG can retransmit an MPLS control message to the BNG, wherein the MPLS control message carries the updated QoS parameter.

Obviously, those skilled in the art should know that each module or step of the embodiments of the disclosure can be implemented by a universal computing device, and the modules or steps can be concentrated on a single computing device or distributed on a network formed by a plurality of computing devices, and can optionally be implemented by programmable codes executable on the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The above is only the preferred embodiments of the disclosure and not intended to limit the scope of protection of the disclosure

INDUSTRIAL APPLICABILITY

According to the embodiments of the disclosure, after the BNG and the TWAG establish the MPLS tunnel and/or PW, or the L2TP tunnel and/or session, the TWAG establishes the GTP/PMIP connection with the mobile network gateway according to the user information, and acquires the address and service parameter of the user; and the TWAG transmits the service parameter of the user to the BNG through the MPLS control message or the L2TP control message. According to the disclosure, the guarantee of the QoS for the user after the introduction of the TWAG is standardized, better communication service can be provided for the user, and the user experience is improved.

What is claimed is:

1. An access method for a mobile UE through a fixed network, comprising:
   establishing one of the following between a Broadband Network Gateway (BNG) and a Trusted WLAN Access Gateway (TWAG): a Multi-Protocol Label Switching (MPLS) tunnel, a Pseudo Wire (PW), a combination of the MPLS tunnel and PW, a Layer 2 Tunnel Protocol (L2TP) tunnel, a combination of the L2TP tunnel and L2TP session,
   establishing, by the TWAG, a General Packet Radio Service (GPRS) Tunnelling Protocol (GTP)/Proxy Mobile Internet Protocol (PMIP) connection with a mobile network gateway according to UE information, and acquiring an address and a Quality of Service (QoS) parameter of the UE; and
   sending, by the TWAG, the QoS parameter of the UE to the BNG through an MPLS control message or an L2TP control message.

2. The access method according to claim 1, wherein the establishment of at least one of the L2TP tunnel or session between the BNG and the TWAG comprises:
   initiating, by the BNG, an authentication request to a Broad Forum (BBF) Authentication Authorization Accounting (AAA) server after receiving an authentication request from the UE; and
   establishing at least one of the L2TP tunnel or session with the TWAG according to an indication decision carried in an authentication response message received from the BBF AAA server.

3. The access method according to claim 1, wherein establishing, by the TWAG, the GTP/PMIP connection with the mobile network gateway, and acquiring the address and QoS parameter of the UE comprises:
   after receiving an Incoming Call Connected (ICCN) message from the BNG at an L2TP session establishment stage, establishing, by the TWAG, the GTP/PMIP connection with the mobile network gateway according to the UE information contained in the ICCN message, and acquiring the address and QoS parameter of the UE;
   or, after receiving an address request message from the BNG at a Point-to-Point Protocol IP Control Protocol (PPP IPCP) stage, establishing, by the TWAG, the GTP/PMIP connection with the mobile network gateway according to the UE information, and acquiring the address and QoS parameter of the UE.

4. The access method according to claim 3, further comprising: before establishing, by the TWAG, the GTP/PMIP connection with the mobile network gateway,
   initiating, by the TWAG, a GTP/PMIP connection request to the mobile network gateway after the UE information in the ICCN message passes authentication;
   or, initiating, by the TWAG, the GTP/PMIP connection request to the mobile network gateway without authenticating the UE information in the ICCN message;
   or, initiating, by the TWAG, an authentication request to the UE after receiving the ICCN message, re-authenticating an identity of the UE, and initiating the GTP/PMIP connection request to the mobile network gateway after the UE passes authentication.

5. The access method according to claim 1, wherein the establishment of at least one of the MPLS tunnel or PW between the BNG and the TWAG comprises:
   initiating, by the BNG, an authentication request to the BBF AAA server after receiving an authentication request from the UE, and establishing at least one of the MPLS tunnel or PW with the TWAG according to an indication decision carried in an authentication response message received from the BBF AAA server.

6. The access method according to claim 1, wherein establishing, by the TWAG, the GTP/PMIP connection with the mobile network gateway according to the UE information, and acquiring the address and QoS parameter of the UE comprises:
   after receiving a UE address request message sent by the BNG through at least one of the MPLS tunnel or PW, establishing, by the TWAG, the GTP/PMIP connection with the mobile network gateway according to the UE information, and acquiring the address and QoS parameter of the UE.

7. The access method according to claim 6, further comprising: before establishing, by the TWAG, the GTP/PMIP connection with the mobile network gateway,
   sending, by the BNG, a message between the TWAG and the UE at a user authentication stage through at least one of the MPLS tunnel or PW to finish the identity authentication of the UE with the TWAG.

8. The access method according to claim 1, wherein sending, by the TWAG, the QoS parameter of the UE to the BNG through the MPLS control message or the L2TP control message comprises:
   sending, by the TWAG, the acquired QoS parameter of the UE to the BNG through a Set-Link-Info (SLI) message or an extended SLI message;
   or, sending, by the TWAG, the acquired QoS parameter of the UE to the BNG through a Label Switched Path (LSP) or PW notification message or an extended LSP or PW notification message.

9. The access-method according to claim 8, wherein the QoS parameter of the UE is packaged in an Attribute Value Pair (AVP) format in the extended SLI message;
   or, the QoS parameter of the UE is packaged in a Type-Length-Value (TLV) format in the extended LSP or PW notification message.

10. The access method according to claim 8, wherein different sessions for different UEs carrying a same Access Point Name (APN) information are established in a same L2TP tunnel between the BNG and the TWAG;
    or, different sessions for different UEs carrying different APN information are established in the same L2TP tunnel between the BNG and the TWAG;
    or, different L2TP tunnels for different UEs carrying the same APN information are established between the BNG and the TWAG;
    or, different sessions for different connection establishment requests of a same user carrying different APN information are established between the BNG and the TWAG.

11. The access method according to claim 8, wherein a PW for different UEs carrying same APN information is established in the same MPLS tunnel between the BNG and the TWAG;
    or, a PW for different UEs carrying different APN information is established in the same MPLS tunnel between the BNG and the TWAG;
    or, different MPLS tunnels for different UEs carrying the same APN information are established between the BNG and the TWAG;

or, different PWs for different UEs carrying different APN information are established between the BNG and the TWAG without establishing the MPLS tunnel between the BNG and the TWAG;

or, different PWs for different connection establishment requests of the same UE carrying different APN information are established between the BNG and the TWAG;

or, a same PW for different connection establishment requests of the same UE carrying different APN information is established and used between the BNG and the TWAG.

12. The access method according to claim 8, further comprising:
in the case that the QoS parameter of the UE changes, sending, by the TWAG, to the BNG an MPLS control message or an L2TP control message containing the updated QoS parameter of the UE.

13. The access method according to claim 12, further comprising:
after the TWAG sends the QoS parameter of the UE to the BNG,
sending, by the TWAG, the address of the UE to the UE.

14. An access system for a mobile UE through a fixed network, comprising: a Broadband Network Gateway (BNG), a Trusted WLAN Access Gateway (TWAG) and a mobile network gateway,
wherein the BNG is configured to establish one of the following with the TWAG: a Multi-Protocol Label Switching (MPLS) tunnel, a Pseudo Wire (PW), a combination of the MPLS tunnel and PW, a Layer 2 Tunnel Protocol (L2TP) tunnel, a combination of the L2TP tunnel and L2TP session, and
wherein the TWAG is configured to establish a General Packet Radio Service (GPRS) Tunnelling Protocol (GTP)/Proxy Mobile Internet Protocol (PMIP) connection with the mobile network gateway according to UE information, acquire an address and a Quality of Service (QoS) parameter of the UE, and sending the QoS parameter of the UE to the BNG through an MPLS control message or an L2TP control message.

15. The access system according to claim 14, further comprising a Broad Forum (BBF) Authentication Authorization Accounting (AAA) server,
wherein the BNG is further configured to initiate an authentication request to the BBF AAA server after receiving an authentication request from the UE, and establish at least one of the L2TP tunnel or session with the TWAG according to an indication decision carried in an authentication response message received from the BBF AAA server.

16. The access system according to claim 14, wherein the TWAG is further configured to establish the GTP/PMIP connection with the mobile network gateway according to the UE information contained in an Incoming Call Connected (ICCN) message after receiving the ICCN message from the BNG at an L2TP session establishment stage, and acquire the address and QoS parameter of the UE;
or, establish the GTP/PMIP connection with the mobile network gateway according to the UE information after receiving an address request message from the BNG at a Point-to-Point Protocol IP Control Protocol (PPP IPCP) stage, and acquire the address and QoS parameter of the UE.

17. The access system according to claim 16, wherein before the TWAG establishes the GTP/PMIP connection with the mobile network gateway, the TWAG is further configured to:
initiate a GTP/PMIP connection request to the mobile network gateway after the UE information in the ICCN message passes authentication;
or, initiate the GTP/PMIP connection request to the mobile network gateway without authenticating the UE information in the ICCN message;
or, initiate an authentication request to the UE after receiving the ICCN message, re-authenticate an identity of the UE, and initiate the GTP/PMIP connection request to the mobile network gateway after the UE passes authentication.

18. The access system according to claim 14, further comprising a BBF AAA server,
wherein the BNG is further configured to initiate an authentication request to the BBF AAA server after receiving an authentication request from the UE, and establish at least one of the MPLS tunnel or PW with the TWAG according to an indication decision carried in an authentication response message received from the BBF AAA server.

19. The access system according to claim 14, wherein the TWAG is further configured to establish the GTP/PMIP connection with the mobile network gateway according to the UE information after receiving the UE address request message sent by the BNG through at least one of the MPLS tunnel or PW, and acquire the address and QoS parameter of the UE.

20. The access system according to claim 14, wherein the TWAG is further configured to send the acquired QoS parameter of the UE to the BNG through a Set-Link-Info (SLI) message or an extended SLI message;
or, send the acquired QoS parameter of the UE to the BNG through a Label Switched Path (LSP) or PW notification message or an extended LSP or PW notification message.

* * * * *